I. MOSS.
MOUNT FOR SNAP FASTENERS.
APPLICATION FILED JUNE 8, 1920.
1,379,202.
Patented May 24, 1921.
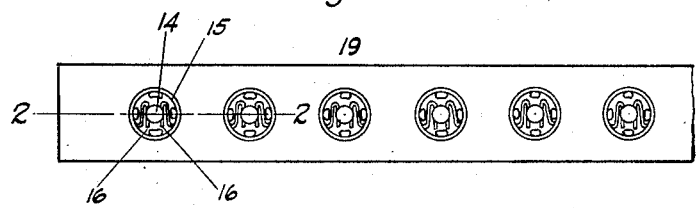
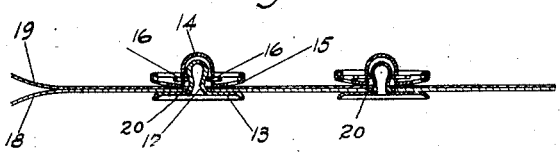
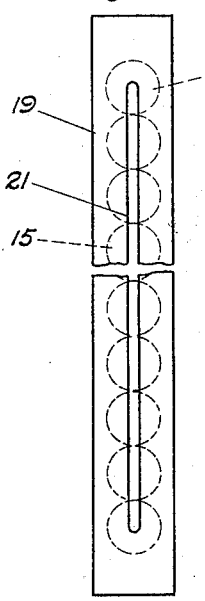
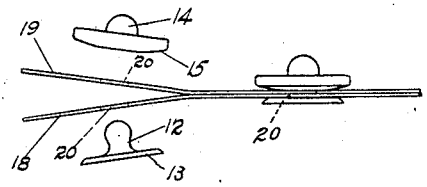
INVENTOR

UNITED STATES PATENT OFFICE.

ISIDOR MOSS, OF BROOKLINE, MASSACHUSETTS.

MOUNT FOR SNAP-FASTENERS.

1,379,202.   Specification of Letters Patent.   Patented May 24, 1921.

Application filed June 8, 1920. Serial No. 387,361.

*To all whom it may concern:*

Be it known that I, ISIDOR MOSS, a citizen of the United States, residing at Brookline, in the county of Norfolk and State of Massachusetts, have invented new and useful Improvements in Mounts for Snap-Fasteners, of which the following is a specification.

This invention relates to the mounting of snap fasteners, the members of which have attaching bases, adapted to be sewed, or otherwise secured to carrying parts, the members of each fastener having complemental means whereby they may be detachably interengaged.

It is the usual practice in mounting such snap fasteners in groups or detachments for sale, to employ a one-piece card as the mount, a group or detachment of fasteners being secured to the card. The card is interposed between the base portions of the members, and has orifices through which portions of the fasteners pass. It is necessary to separate the fastener members before they are attached to parts of garments, or other carrying parts. The separation of the members, particularly those of the smaller sizes, is a somewhat difficult and inconvenient prying operation, usually performed by the finger-nails of the user while the fasteners are engaged with the mount.

My invention has for its object to provide a mount adapted to be used as a means for carrying a group or detachment of snap fasteners and for conveniently separating the members of the fasteners carried thereby, preparatory to the attachment and use of the fasteners, so that it is not necessary to pry the members apart by means other than the mount.

The invention is embodied in the improved mount hereinafter described and claimed.

Of the accompanying drawings forming a part of this specification,—

Figure 1 is a side view of a mounted detachment of snap fasteners carried by a mount embodying the invention.

Fig. 2 is an enlarged section on line 2—2 of Fig. 1.

Fig. 3 is a view similar to Fig. 2, illustrating the disconnection of the members of one of the fasteners from each other and from the mount.

Fig. 4 is a plan view, showing a different embodiment of the invention.

The same reference characters indicate the same parts in all of the figures.

To illustrate the invention I show a well known type of snap fastener, comprising a stud member 12, having an attaching base 13, and a socket member 14, having an attaching base 15, and resilient wire jaws 16, occupying slots in opposite sides of the socket member, and adapted to engage the head of the stud member 12. I desire it understood, however, that various other types of snap fastener may be mounted in accordance with the invention.

In carrying out the invention, I provide a mount composed of separable layers 18 and 19, preferably of flexible paper, the thickness of which is such that the layers, when interposed between the bases 13 and 15, permit the interengagement of the stud and socket portions. The layers are provided at suitable intervals with coinciding orifices 20, through which portions of the fasteners pass, said portions, when the type of fastener here shown is employed, being the stud members 12.

The fasteners are secured to the mount in the same manner that they are secured to the ordinary one-piece mount or card, that is to say, portions of the fasteners, such as the studs 12, are passed through the mount and engaged at one side of the mount with other portions of the fasteners, the bases 13 bearing on one side of the mount, and the bases 15 on the opposite side. It will now be seen that when the mount layers are forcibly pulled apart, the fastener members are separated from each other and from the mount, as indicated by Fig. 3.

The mount layers may be strips of indeterminate length, any desired number of fasteners being applied to the mount.

Instead of providing the mount layers with spaced apart orifices 20, I may provide each layer with a single elongated orifice or slot 21, as shown by Fig. 4, the orifices of the two members coinciding and receiving portions of the fasteners. In this case the bases of the fasteners may abut against each other, as indicated by dotted lines, the fasteners at the opposite ends of the detachments or group bearing against the opposite ends of the elongated orifices or slots.

I claim:

A mount for holding and separating snap fasteners composed of members having attaching bases and complemental stud and socket parts projecting from said bases, and adapted to be separately interengaged, said mount being composed of superimposed layers, the aggregate thickness of which is such that the mount may be interposed between the bases when the stud and socket parts are interengaged, said layers being provided with coinciding orifices formed to receive the said stud parts, the layers being separable from each other to separate the fastener members.

In testimony whereof I have affixed my signature.

ISIDOR MOSS.